United States Patent [19]

Assing-Collier

[11] Patent Number: 4,931,299

[45] Date of Patent: Jun. 5, 1990

[54] PROCESS FOR PREPARING SALTED-AND-DRIED FISH FOR EATING

[76] Inventor: Amoy M. Assing-Collier, 62 Delancey Cr., Markham, Ontario, Canada, L3P 7E1

[21] Appl. No.: 930,263

[22] PCT Filed: Mar. 12, 1986

[86] PCT No.: PCT/GB86/00136

§ 371 Date: Nov. 14, 1986

§ 102(e) Date: Nov. 14, 1986

[87] PCT Pub. No.: WO86/05360

PCT Pub. Date: Sep. 25, 1986

[30] Foreign Application Priority Data

Mar. 19, 1985 [GB] United Kingdom ............... 8507120

[51] Int. Cl.$^5$ .............................................. A23L 1/325
[52] U.S. Cl. .................................... 426/325; 426/332; 426/402; 426/407; 426/506; 426/643
[58] Field of Search ............... 426/401, 402, 506, 643, 426/325, 332, 407

[56] References Cited

U.S. PATENT DOCUMENTS

| 229,368 | 6/1880 | Brink | 426/643 |
|---|---|---|---|
| 1,250,384 | 12/1917 | Taylor | 426/643 |
| 2,088,831 | 8/1937 | Ash et al. | 426/643 |
| 2,411,188 | 11/1946 | Borg | 426/643 |
| 2,411,736 | 11/1946 | Kleinschmidt | 426/643 |

*Primary Examiner*—Barry S. Richman
*Assistant Examiner*—Timothy M. McMahon
*Attorney, Agent, or Firm*—Anthony Asquith & Co.

[57] ABSTRACT

A method of preparing the traditional salted-and-dried fish is disclosed. The dried fish is first soaked in cold water to re-hydrate the fish and to reduce the salt content. Secondly, the re-hydrated fish is centrifuged until almost dry. The almost-dry fish is sealed in cans, and then cooked. The product is more nutritious and more tasty than salted-and-dried fish prepared in the home, and is far more convenient in that it can be eaten straight from the can.

11 Claims, No Drawings

PROCESS FOR PREPARING SALTED-AND-DRIED FISH FOR EATING

This invention relates to the preparation of fish.

For many years, fish such as cod has been preserved by salting and drying. The drier the product, the longer it lasts. Salted-and-dried fish is known by such terms as BACALAO or BACCALA in Mediterranean countries.

In the dried condition the fish is uneatable. To prepare salted-and-dried fish for eating, it has traditionally been necessary to go through a lengthy and skill-demanding process. First, the dried, salted product is left to stand for many hours in cold water so that the fish may become re-hydrated by absorbing the water. The water is changed frequently, for the purpose of gradually diminishing the salt-content of the fish.

When the re-hydration process is complete, the fish is ready to be cooked and eaten. The amount of saltiness in the fish is a matter of taste; the salt content can be controlled by the number of times the water is changed during re-hydration.

Re-hydration of salted-and-dried fish can be accomplished in a shorter time if the water is hot, or even boiling. Though the time taken is shorter, the disadvantages of using hot water are, apart from the cost of the fuel needed to heat the water: a loss of texture and taste; loss of nutrients into the hot water; the need for attention to the process for a long period; and smell.

Notwithstanding these difficulties, salted-and-dried fish does have the great advantages that it is an inexpensive source of protein, and it can be stored without refrigeration in virtually any climate.

In many countries, salted-and-dried fish is a staple food, especially for poor people. And the taste of the product, when it is properly prepared in the traditional manner, has come to be appreciated by all sections of the community. Eating salted-and-dried fish has religious significance in many countries.

On the other hand, the number is dwindling of people who are willing to put that amount of effort into preparing food, no matter how good the food tastes. This invention is aimed at simplifying the preparation for eating of the traditional salted-and-dried fish.

GENERAL DESCRIPTION OF THE INVENTION

In the invention, the salted-and-dried fish is sealed into cans. The fish is then cooked in the can. The consumer simply buys a can of the thus-prepared fish, and eats it (cold) straight from the can, or the consumer can heat the fish prior to eating it.

The fish cannot however be canned while in the salted and dried condition but must first be processed. If the canning of salted-and-dried fish is to be successful, it has been found that the following steps are essential: first, before it can be put in cans, the salted-and-dried fish must be fully re-hydrated, and second, the re-hydrated fish must be dried to an almost-dry or just-damp condition. Only after that, can the fish be sealed into the cans and cooked.

PRIOR ART

It has not previously been proposed to can salted-and-dried fish by any process. Furthermore, the process steps of fully re-hydrating a dehydrated product, followed by extracting water to leave the product just-damp, followed by canning, likewise have not previously been proposed for any foodstuff.

U.S. Pat. No. 2,411,188 (BORG, Feb. 17, 1942) teaches a method of canning fish. Here fresh fish (i.e. fish ascaught, not salted and dried) has its water content reduced prior to sealing the fish into the cans.

U.S. Pat. No. 2,718,470 (KAUFMAN, Sept. 20, 1955) shows an improvement that is applicable to the preservation of foodstuffs generally, and particularly fruit and vegetables, in which fresh food is dried to a just-damp condition, and then sealed into cans. The food is cooked, or sterilized, in the cans.

U.S. Pat. No. 816,343 (LAMB, Mar. 27, 1906) shows a method of preserving fresh fish. Again, the method involves partially drying the fresh fish before sealing the fish in cans. The fish is sterilized in the cans.

There are two main features which distinguish this invention from the prior art: first, none of the prior art teaches any method at all of canning salted-and-dried fish, to which the invention exclusively relates; and second, none of the prior art teaches the combination of steps of fully re-hydrating the fish from the de-hydrated condition, then extracting water leaving the fish just-damp, then cooking the fish in sealed cans.

In the above-referenced LAMB patent, it is suggested that recently-salted fish does not possess the same flavour as fish that has been allowed to stand for some time after salting. That is true. It is essential, in this invention, that the salted-and-dried fish to which the process of the invention is to be applied is fish that has been left in the salted-and-dried condition for a substantial period, for example for some weeks; if it is canned too soon, the fish will not have the traditional flavour of salted-and-dried fish. The substantial period is long enough that fish left for such a period in an unsalted and undried condition would go bad.

The present invention lies in the process of preparing the fish. A preferred manner of carrying out the process will now be described in detail.

In the re-hydrating stage, the dried fish is left to stand in a tank of preferably cold water for several hours. The ratio of the quantities of fish to water affects the amount of salt that is dissolved out of the fish, which affects the final taste of the product. A ratio of fish:water of 1:20 gives good results.

The length of time that the fish is left in the tank should be long enough that all the fish is completely re-hydrated. If the fish were only partly re-hydrated, some hard un-hydrated lumps would be present. Such lumps would have a locally high salt content, and such lumps would also make it difficult to separate the fish into chunks. A water-soak period of eighteen hours gives good results.

It is preferred that only a single tankful of water be used, because any movement of the fish during re-hydration can cause the fish meat to break up. However, the water can be changed for fresh water from time to time if required. As an alternative, the water may be hot, or even boiling, which would speed up the re-hydration time, but boiling does tend to damage the fish meat. Also, the hotter the water, the more nutrients are dissolved into the water, and lost.

The preference not to agitate the fish indicates that the water in the tank should be still. The fish should not be sprayed with the water, nor washed in it, because that kind of action can cause a break-up of the meat. If the meat were to break-up, the finished product in the cans might become unpalatably mushy or pasty. The fish should not therefore be shredded or ground either before, during, or after re-hydration.

On the other hand, the fish may be separated into chunks prior to re-hydration, because then the re-hydration process takes less time. Of course the meat has to be broken up into can-sized chunks at the canning stage. The manner in which the meat is broken is preferably by flaking, in which the meat is separated along the natural fibres of the meat. Flaking leaves the separated chunks of meat still in a substantially coherent condition, so that the problem of the meat going mushy in the cans is largely avoided.

Once re-hydration is complete, the water is drained away, and the residual water is then extracted from the fish. The extraction is preferably carried out in a centrifuge, since it is an easy matter to get fish into an homogeneous just-damp or almost-dry condition in a centrifuge. Drying by evaporation is a possible alternative, but it is hard to achieve a homogeneous just-damp condition by evaporation. The traditional way of drying the fish in the initial salted-and-dried stage is by evaporation, but there the requirement is to get the fish as dry as possible, not almost-dry. For a uniform almost-dry or just-damp condition, centrifuging is best.

An alternative to centrifuging would be to squeeze the fish with a mesh. The fish could even be put in the cans and then squeezed while in the can by means of a mesh. The water that comes through the mesh would be drained away. Centrifuging, however, is more suitable as a production-line operation. For the purposes of this specification the expression "just-damp or almost-dry" refers to a quality or condition of the fish, being that quality or condition that the fish is in after it has just been centrifuged. As mentioned, the quality or condition can be achieved by other methods of forcibly, but gently, squeezing the fish meat, apart from centrifuging per se.

The preference not to agitate the fish can also be achieved during centrifuging since the fish is merely compressed slightly in the centrifuge: the meat is not manipulated and cannot become torn or otherwise damaged.

It is essential, in this invention, that the fish not be canned in the fully re-hydrated (i.e. wet) condition. If it were, the fish would go mushy. Also, upon cooking, the natural juices of the fish mix with whatever water is present in the can to produce a broth. If the fish were canned wet, the water content of this broth would be too high, and the broth would be unpalatable. Furthermore, if the fish were canned wet, the product in the can would be quite unlike the salted-and-dried fish that has been prepared by the traditional methods.

The almost-dry fish, as it comes out of the centrifuge, is separated into can-sized chunks by flaking, and placed in the cans. A little vegetable oil is added in the can. No other ingredients need be added.

The vegetable oil helps to keep the fish even-textured, and also prevents the fish from going mushy in the can.

The cans are sealed, and placed in a retort for cooking. A typical cooking cycle is to hold the cans at 120 degrees in the retort, followed by a water drench to cool the cans. For 250 g cans, the cooking time may be 30 minutes or so, and 60 minutes for 500 g cans.

During cooking, natural juices in the fish mix with the small amount of water in the can to produce an extremely tasty and nutritious broth—more so than that of the traditional methods of preparing salted-and-dried fish.

Salted-and-dried fish can be obtained with the bones and skin still present, or with the bones and skin removed. The bones and skin must be removed prior to canning, and this is done preferably when the fish is still wet after re-hydration. The fish should not be ground, or be in any other form but coherent chunks or, preferably, whole individual fish (except of course that the fish should be eviscerated). It is sometimes the case that salted-and-dried fish has been subjected to a pre-cooking operation, before drying, to facilitate removal of the skin and bones, but apart from that the fish should preferably be completely raw when it is placed in the cans.

The fish that is most commonly preserved by salting and drying is cod, but other fish such as hake and pollock are also available in that form and can be used with this invention. A generic term for fish of this kind is "ground fish".

The salted-and-dried condition that is referred to in this specification may be further described as follows.

The fish that is to be salted and dried is brought ashore and placed in containers of brine. The fish absorbs salt from the brine, and extra salt must be added to the containers from time to time to keep the brine in a concentrated state.

Depending on the size and type of fish, it make take some days for the fish to become thoroughly salted. It is important that the fish be salted right through, because an only-partially salted region of the fish meat may go bad.

After salting, the fish is soaking wet from the brine. The fish is then dried. The thoroughness of the drying process may be varied depending on the manner in which the salted-and-dried fish is to be transported and marketed. If the fish is to be sold to consumers located quite near the salting and drying facilities, then the fish need not be quite so thoroughly dried as when the fish is to be transported and stored for long periods before sale.

Absolutely bone-dry fish is the easiest to transport, from a weight point of view and because in the bone-dry state the meat has virtually no smell. On the other hand, total de-hydration requires expenditure of extra fuel and time in the drying process. The fish sold to markets close to the salting and drying facility therefore usually is not in the absolutely bone-dry state, but is in a not-quite-dry state known as the "green" state, or the semi-dehydrated state. In areas near to salting and drying plants, therefore, it is common for the fish to be sold in the green state, whereas in areas remote from the plant it is more common for the fish to be in the bone-dry state.

The method of the invention is to be applied to salted-and-dried fish; this expression, in the context of the invention, includes fish in the absolutely bone-dry state, and also fish in the green state.

I claim:
1. A process for preparing salted-and-dried fish; where the fish on which the process is carried out is fish that has been salted and dried by the steps:
   (i) of laying open and eviscerating the fish while in a fresh condition;
   (ii) of immersing the fish in concentrated brine until the fish has absorbed enough salt to preserve the fish;
   (iii) of extracting water from the fish, and of dehydrating the fish to such an extent that the fish has the hard, bone-dry texture or the almost hard, bone-dry texture of traditional salted-and-dried fish;

where the process comprises the steps:
- (a) of re-hydrating fish that has been salted and dried according to the said steps (i) to (iii), being fish that has remained in the said salted and dried condition for a substantial period, by soaking the fish in fresh water;
- (b) of extracting water from the re-hydrated fish until the fish is in the just-damp or almost-dry condition;
- (c) of placing the just-damp or almost-dry fish into cans, having ensured, before doing so, that the fish is de-boned and skinned;
- (d) of sealing the cans;
- (e) and of substantially completely cooking the fish in the can, whereby the fish is ready for eating straight from the can.

2. Process of claim 1, where the fish is substantially completely raw and uncooked prior to being placed in the cans.

3. Process of claim 1, where water is extracted from the re-hydrated fish by the step of spinning the fish in a centrifuge.

4. Process of claim 1, where a small quantity of vegetable oil is added to the just-damp or almost-dry fish in the cans.

5. Process of claim 1, where the cans are held in a retort at about 120 degrees C. for about 30 minutes per 250 g of fish in the can.

6. Process of claim 1, where the fish is kept from being agitated by and in the water.

7. Process of claim 1, where the water used for soaking the salted-and-dried fish is at room temperature (cold).

8. Process of claim 1, where the salted-and-dried fish on which the improved process is carried out is in the form of substantially coherent chunks.

9. Process of claim 8, where the re-hydrated fish is separated into pieces that are small enough to fit into the cans, by flaking the fish into chunks when the fish is in the just-damp or almost-dry condition.

10. Process of claim 1 where the fish is ground fish.

11. Process of claim 10 where the fish is cod.

* * * * *